UNITED STATES PATENT OFFICE.

ALBERT ERNEST BATTLE, OF ALDGATE, LONDON, ENGLAND.

ELECTROLYSIS OF TIN AND ITS SALTS.

1,202,149.     Specification of Letters Patent.     Patented Oct. 24, 1916.

No Drawing.     Application filed May 24, 1915. Serial No. 30,228.

*To all whom it may concern:*

Be it known that I, ALBERT ERNEST BATTLE, subject of George V, King of Great Britain and Ireland, and residing at Newlyn House, 4 and 5 High street, Aldgate, in the county of London, England, have invented certain new and useful Improvements in Electrolysis of Tin and Its Salts, of which the following is a specification.

This invention relates to the electrolysis of tin and its salts, and has for its object the provision of an electrolyte that will enable the metal to be obtained from its ores, to be electro-deposited on iron, steel or other metals or metallized and conductive surfaces and (or) to be recovered from the surfaces of other metals, as for instance from tinned plate, and other metallized and conductive surfaces.

The extraction of the metal from its ores and the stripping or recovery of the metal from tinned or coated surfaces are hereinafter and in the claiming clauses included in the term "recovery."

According to the present invention tin or a salt of tin as for instance sulfate or protochlorid is dissolved in ordinary phosphoric acid (ortho phosphoric acid) either concentrated or dilute. The salt may be dissolved in concentrated phosphoric acid and the solution used as the electrolyte, or it may be diluted by the addition of water or glycerin. Or the salt may be dissolved in water and phosphoric acid added. In this case a slight addition of phosphoric acid will cause some of the tin salt to be precipitated, so sufficient acid must be added to have an excess capable of redissolving the salt. The precipitation of the tin salt by the phosphoric acid in the case of stannous chlorid may be prevented by the addition of a small quantity of hydrochloric acid, or in the case of stannous sulfate by the addition of a small quantity of sulfuric acid before the phosphoric acid is added to the solution.

The degree to which the solution can be diluted will depend on the amount of tin salt in the solution, that is, there should be sufficient phosphoric acid present to keep the salt in solution. The amount of salt in solution will depend on the purpose for which the solution is required. If a firm adhesive deposit is required, as for instance for electrolytic tinned plate, the solution should be kept rather weak in tin salt to prevent the formation of a spongy deposit. The exact amount will depend on the degree of agitation of the solution, its temperature and the current density being used. If the solution is to be used for recovering tin from its ores or for recovering tin from tinned iron, an adhesive deposit may not be required and the formation of a deposit of spongy tin be found quite satisfactory, in which case the solution may be much richer in tin salts.

For a good deposit of tin on to iron surfaces with the solution at normal temperature, and only slightly agitated, I have found that about 50 grams per liter of tin salt dissolved in an electrolyte of 10 per cent. phosphoric acid, gives very satisfactory results. When no salt of tin is added to the electrolyte but the metal in solution is obtained by dissolving the anode, it is doubtful if it ever exists as a salt of the metal, for being in solution it would be dissociated from the acid radical with which, when out of solution, it would continue to form the salt.

Instead of being dissolved in water the salts may be dissolved in a solution of water and pyrophosphate of soda before or after addition of the phosphoric acid, or pyrophosphate of soda may be added to a solution of tin salts before or after addition of the phosphoric acid. Agents such as gelatin, gums, glucose, dextrin, glycerin, which are sometimes added to electrolytes to improve the deposit and increase the current density, may, if required, be added to this electrolyte.

The solution may be applied for the electro-deposition of tin on to other metals, for winning tin from its ores, for removing tin from tinned plate, either entirely, as for instance from scrap tinned plate, old tin cans and the like, or partially, as reducing the amount of tin on tinned plates made by the usual process of dipping in molten tin. Tinned plate which has been thus treated has a peculiar crystalline mottled appearance similar to zinc coated sheet iron and the solution may be applied to obtaining this effect as well as to reducing the amount of tin on the plates. In the extraction of tin from its ores, the usual methods of electrolytic work may be followed, that is, the ore may be used as the anode and the metal obtained direct from it, or the ore may be dissolved in the electrolyte and the metal then recovered electrolytically.

It is to be understood that the addition of substances, which in solution will form phosphoric acid, may be used to form the electrolyte instead of the phosphoric acid. An organic salt or organic salts may, if desired, be introduced into the solution.

I claim:

1. The process of electrolytically depositing tin consisting in passing an electric current through an electrolyte containing orthophosphoric acid and a tin salt in solution, substantially as described.

2. The process of electrolytically depositing tin consisting in passing an electric current through an electrolyte containing orthophosphoric acid and a tin salt of a mineral acid in solution, substantially as described.

3. The process of electrolytically depositing tin consisting in passing an electric current through an electrolyte containing orthophosphoric acid charged with tin and alkali pyrophosphate.

4. The process of electrolytically depositing tin consisting in passing an electric current through an electrolyte containing orthophosphoric acid, a salt of tin and sodium pyrophosphate in solution.

In witness whereof I have hereunto set my hand in the presence of two witnesses.

ALBERT ERNEST BATTLE.

Witnesses:
JOHN FRANK BONIFACE,
W. E. YOUNG.